United States Patent [19]
Hirsch et al.

[11] 3,788,469
[45] Jan. 29, 1974

[54] PROCESS FOR REMOVING ASH FROM PRECIPITATORS

[75] Inventors: Ernest G. Hirsch, Foxboro; George L. Nelson, Westwood, both of Mass.

[73] Assignee: New England Power Company, Westboro, Mass.

[22] Filed: July 13, 1972

[21] Appl. No.: 271,498

[52] U.S. Cl............................ 210/73, 55/85, 210/84
[51] Int. Cl............................................. B01d 21/26
[58] Field of Search...... 55/85, 228; 210/73, 84, 60, 210/195, 512, 512 M

[56] References Cited
UNITED STATES PATENTS

| | | | |
|---|---|---|---|
| 3,509,695 | 5/1970 | Egan et al........................ | 55/228 X |
| 2,754,968 | 7/1956 | Vegter et al..................... | 210/73 X |
| 2,142,406 | 1/1939 | Nonhebel et al................ | 55/228 X |
| 3,203,156 | 8/1965 | McGregor et al............... | 55/228 X |

OTHER PUBLICATIONS
"The Hydrocyclone" by D. Bradley, Pergamon Press Ltd., 1965, pp. 41, 42, and 250.

*Primary Examiner*—John Adee
*Attorney, Agent, or Firm*—Edgar H. Kent

[57] ABSTRACT

A process for removing fuel ash from precipitator bottoms circulates water through the bottoms to carry off the ash, then passes the water at least in part through a hydrocyclone separation stage to produce a major overflow fraction of reduced solids content and a minor overflow fraction of increased solids content, and recirculates the water withdrawn from the bottoms less the underflow fraction back through the bottoms at a rate to maintain the solids concentration less than that at which substantial settling out of solids will occur. Preferably, the recirculation is continuous, and the underflow from said hydrocyclone separation stage is subjected to secondary stage hydrocyclone separation from which the underflow may be subjected to tertiary stage solids separation, the overflow from one or both further separation stages being recirculated.

16 Claims, 5 Drawing Figures

PROCESS FOR REMOVING ASH FROM PRECIPITATORS

BACKGROUND OF THE INVENTION

1. Field of the Invention

This invention relates to the removal of ash from flue gases, more particularly to a wet process for removing the ash from precipitators.

2. Description of the Prior Art

For reasons of the ecology, it is important to separate the ash from flue gases discharged to atmosphere such as the flue gases of oil or coal fired power plants, to prevent contamination of the atmosphere thereby. Normally, such separation is effected by precipitating or settling the ash in electrostatic precipitators, scrubbing towers, ash pits, and the like, herein generally called "precipitators." The ash must in turn be removed from the separating equipment, and this has been done by collecting the ash in water which carries it away from the separator.

While the percentage of ash to fuel is low particularly in oil, the amount thereof separated is substantial over a period of time and may amount to several tons a day in large power plants. The precipitated ash, if allowed to stand in the precipitator bottoms for any substantial time, settles out on the bottoms and their sides and cools as a hard precipitate, so hard that it is often necessary to break it off with jackhammers in order to defoul the bottom. In addition, if the ash concentration becomes sufficiently high, settling out of the ash occurs in, and fouls, the exit piping and connections from the bottoms.

The foregoing difficulties can be alleviated by flushing the ash-receiving water from the bottoms at a frequency designed to prevent such settling of ash in the bottoms and connected piping. But such practice requires vast quantities of water which cannot be recirculated to any substantial extent without treating to remove the ash, since its ash concentration otherwise soon becomes too high. Suggestions of cleaning recirculation water from precipitator bottoms with settling tanks (see, e.g., U.S. Pat. No. 3,509,695) or centrifuges or filters (see, e.g., U.S. Pat. Nos. 2,142,406 and 3,444,668) have not been acceptable for ash. Settling tanks involve problems of fouling similar to those encountered with the bottoms themselves; and are wasteful of land area. Centrifuges and filters are difficult to operate effectively on ash at the low concentrations concerned, and are very expensive, including the need for manual supervision. Accordingly, it has been a common practice to return the water circulated through the bottoms to ocean or stream with or without lagooning, despite adverse effects of such practice on the ecology.

SUMMARY OF THE INVENTION

An object of this invention is to provide a process for the removal of ash from precipitators by circulating water through their bottoms at a rate sufficient to prevent fouling accumulation of ash in the bottoms, treating the water to remove ash therefrom at a rate sufficient to keep the ash concentration below that at which fouling of the bottoms and piping will occur and recirculating the treated water to the bottoms.

Another object is to provide such a process wherein the major part of the water used is recirculated and the equipment required is relatively inexpensive in capital and operation costs.

A further object is to provide such a process wherein nearly all of the water used is recirculated, the ash separation being effected by at least primary and secondary stage treatments, the treated water from each stage being recirculated.

Still another object is to provide such a process wherein valuable components of the ash are segregated and recovered.

It has been discovered that hydrocyclones are peculiarly adapted for the ash concentration control of the recirculated precipitator bottom waters concerned, particularly in a primary stage, but also in a secondary stage of treatment if one is used, preferred hydrocyclones being similar in construction and operation to those used in the paper industry for separating dirt and other foreign matter from paper-making fiber in aqueous suspension.

In a primary stage of treatment the centrifugal force separation by the hydrocyclones is relatively low, i.e., total suspended solids removed, particularly initially after start-up with new water when the ash concentration is extremely low. However, the ash concentration of the water recirculated through the hydrocyclones and the bottoms, while increasing for a time after start-up, tends to stabilize, virtually permanently, at or below a percentage which is low enough to prevent settling of the ash and fouling of the bottoms as previously described. In the case of oil ash this percentage may be below 3 percent by weight. The reasons for such stabilization may include a balancing in a continuous separation operation of the amount of incoming ash particles from the precipitators with the removal rate of the hydrocyclones plus an interaction between solids in solution and suspended solids.

In addition to the foregoing advantages hydrocyclones can be effectively operated at very low bleed rates so that the underflow from a primary stage to a secondary treatment stage or disposal is only a small percentage, for example, 5 percent or less, of the total flow thereto. This in turn means that the primary stage underflow is so small and so relatively concentrated that it can be handled easily in further concentrating or disposal systems.

In a preferred practice of the invention, water is constantly circulated to the precipitator bottoms to receive the ash therefrom and carry it off. All or part, usually less than all, such as 30–70 percent, of the ash-containing water from the bottoms is passed in parallel through a battery of primary stage hydrocyclones operating with a low volumetric bleed rate, e.g., about 2 percent, of concentrated ash solids and water. The overflow from the hydrocyclones is recirculated to the bottoms together with any fraction of the water from the bottoms that was not treated in the hydrocyclones. The underflow, containing concentrated ash solids separated to the hydrocyclone outer wall by centrifugal force, is passed through a battery of secondary stage hydrocyclones in parallel which may have the same or a somewhat higher bleed rate than that of the primary stage, e.g., up to about 10 percent.

The overflow from the secondary stage hydrocyclones is recirculated to the precipitator bottoms. The underflow from the secondary hydrocyclones is a very small percentage of the total circulation to the bottoms (e.g., less than about 0.5 percent) and has a high concentration of ash solids compared to the underflow from the primary stage hydrocyclones. It is therefore readily disposable with or without further treatment. Preferably, the underflow from the secondary stage hydrocyclones is treated for even further concentration of ash solids, as in one or more centrifuges or filters, the overflow from this tertiary stage treatment being recirculated to the precipitator bottoms while the underflow is disposed of, as by land fill.

Where a tertiary stage separation is made, the amount of make-up water that needs to be added to the total recirculation through the precipitator bottoms is so relatively minute that the system is nearly a total recirculation system, less removed solids. However, tertiary stage treatment, and even a secondary stage treatment, can be omitted. The underflow from the secondary stage is so relatively small compared to the total recirculation flow that, in many cases, it may be disposed of as such without difficulty. Particularly with small plants, the underflow from the primary stage is also sufficiently low to enable satisfactory disposal without further treatment.

The rate of recirculation to the precipitator bottoms is preferably such that the concentration of solids received by the water from the precipitators, at each pass, is low, for example less than 0.1 percent by weight. At such low concentrations the hydrocyclones have a relatively low solids content in the bleed flow but as the solids concentration increases the solids removal in the hydrocyclones increases and the solids concentration tends to stabilize below the desired maximum.

In an alternative, although not preferred, practice of the process, water may be intermittently circulated to the precipitator bottoms. For example, the bottoms may be filled with water and amptied and flushed successively after each has reached a predetermined maximum concentration, below the dangerous, settling-out concentration. In such a system the bottoms may be equipped with mechanical agitators to mitigate solids settling, and the agitators may be equipped to signal for emptying and flushing when the torsional resistance of the agitator reaches a predetermined maximum. Or the bottoms may be emptied and flushed in a predetermined timed sequence.

The underflow from any stage may be treated for the recovery of valuable components of the ash, as by chemical precipitation or agglomeration. However, it has been noted that certain valuable components, such as vanadium pentoxide and nickel salts in the case of certain types of oil ash, tend to concentrate in the recirculating water, particularly if these components are to some extent water-soluble. Where the quantity of such valuable components warrants, our process includes continuously or intermittently diverting recirculation flow from the primary stage for treatment for the recovery of desired valuable components as by chemical precipitation.

DESCRIPTION OF THE PREFERRED EMBODIMENTS

Figure 1:
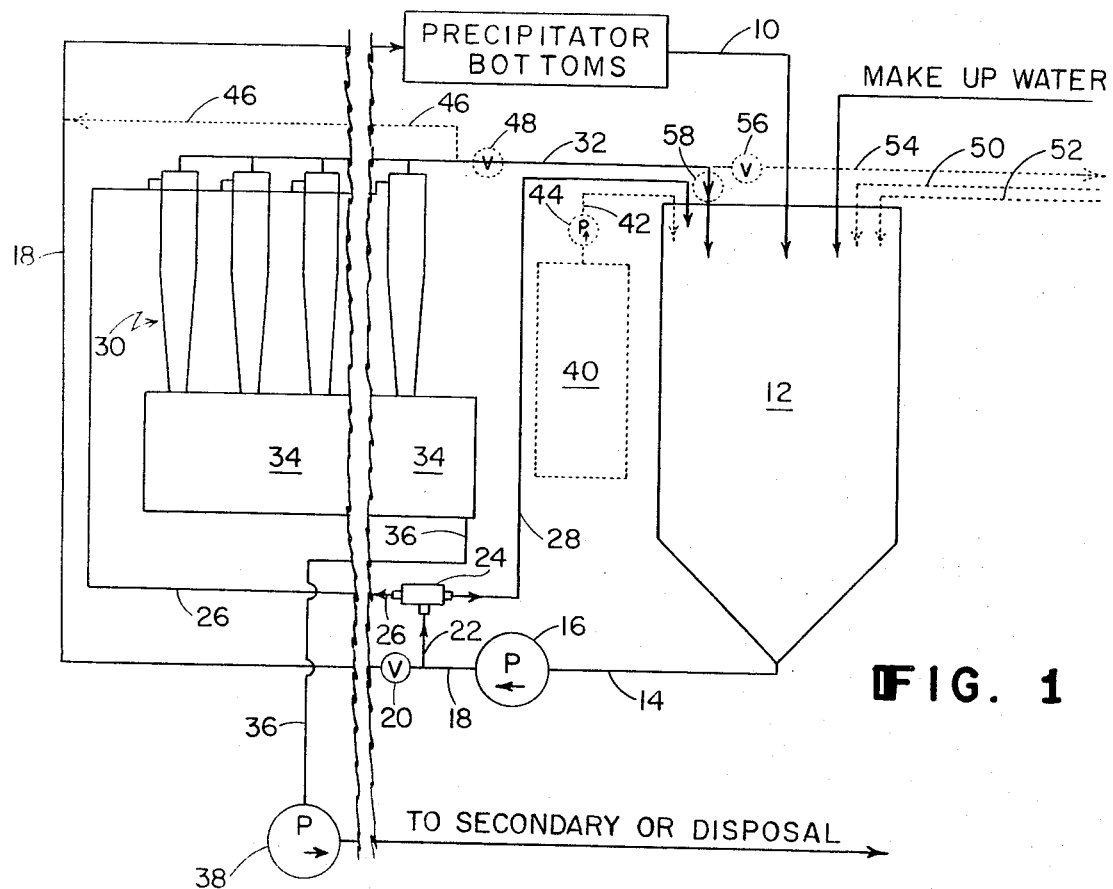
FIG. 1 is a flow sheet of the process in a primary stage treatment, with certain options indicated in dotted lines.

Referring first to the primary stage flow sheet of FIG. 1, the precipitator bottoms are therein indicated by a box so labeled. Water is circulated out of all the bottoms to a header pipe 10 which discharges into a surge tank 12. Pipe 14 from a bottom outlet of tank 12 goes to the suction side of pump 16 which discharges through pipeline 18 which goes to the inlet side of the precipitator bottoms through a valve 20. A branch pipe 22 leads from pipe 18, between valve 20 and pump 16, to a three-way variable flow distributing valve 24 which has two output pipes 26 and 28. Branch pipes from pipe 26 are connected to the inlets of a battery of hydrocyclones designated generally 30, while pipe 28 is a return line to tank 12.

The overflow or accepts outlets from the hydrocyclones are connected to a header pipe 32 which is shown in full lines as returning the overflow to tank 12. The underflow or rejects outlets from the hydrocyclones discharge to a tank or trough 34 and pass therefrom through pipeline 36 to a pump 38 which discharges them through a pipeline to secondary stage separation or disposal as indicated by its label "To Secondary or Disposal." The equipment indicated by full lines in FIG. 1 is completed by an input pipe to tank 12 for make-up water, as indicated by its label.

A usual operation of the system shown in full lines in FIG. 1 is to adjust valves 20 and 24 so that part of the flow from pump 16 in pipe 18, such as 30 to 70 percent thereof, is diverted into pipe 22 and directed by valve 24 into pipe 26, with pipe 28 closed by valve 24. This arrangement works well when the rate of ash deposit from the precipitator bottoms into the circulated water, and the water circulation rate through the bottoms, are such that the solids deposited in the water in a single pass through the bottoms produces a low percent solids, such as a small fraction of 1 percent. As operation continues, the solids concentration in the recirculated water entering tank 12 from pipe 10 increases but is diluted by the hydrocyclone overflow from pipe 32 at lower solids concentration. As the solids concentration in the feed to the hydrocyclones increases, the amount of solids separated thereby to tank 34, pipe 36 and pump 38 also increases, until it tends to stabilize around an average value. It may be desirable from time to time to adjust the pH of the circulating flow by adding a chemical such as lime. Such chemical addition may be made in tank 12 and to this end there is shown in dotted lines a chemical supply tank 40 with output pipeline 42 to a pump 44 and thence into tank 12. Pump 44 may be controlled automatically or manually under the supervision of a pH meter in tank 12. Valve 24 may be adjusted to return to tank 12 via pipeline 28 the fraction of the output of pump 16 which goes to pipe 22. This permits isolation from the circulation system of the hydrocyclones without terminating or changing the circulation to the precipitator bottoms or through tank 12, as may be desirable from time to time.

Treating only part of the recirculation flow has certain advantages. It enables the use of proportionally more water in the total circulation than is needed for recirculation through the precipitator bottoms, which desirably lowers the solids concentration fluctuations. Also, fewer hydrocyclones are required than would be needed to treat all the circulation flow at the desired operating feed rate. However, where the ash content of the gas treated in the precipitators is high (it is usually condiderably higher where coal rather than oil is the fuel), it may be desirable to pass the entire recirculation flow to the precipitator bottoms through hydrocyclones. This may be done on a constant or intermittent basis.

FIG. 1 indicates by dotted lines an arrangement permitting treatment of the entire recirculation flow in hydrocyclones. A pipeline 46 leads from the hydrocyclone overflow header line 32 to pipe 18. A valve 48 in line 32 may be closed to prevent flow through line 32 beyond it and to divert all hydrocyclone overflow through pipeline 46 to pipeline 18 and thence through the precipitator bottoms. Valve 20 may be closed so that all flow from pump 16 is diverted through pipe 22, valve 24 and pipeline 26 to the hydrocyclone inlets. Additional hydrocyclones can be provided as needed to handle the added flow.

If the flow sheet is designed for constant treatment of all recirculation flow in hydrocyclones, pipe 26 is connected directly to pump 16, line 46 is connected directly to the precipitator bottoms, and pipes 18 and 22, valves 20 and 24 and the portion of header pipeline 32 beyond pipe 46 with valve 48 are omitted.

Figure 3:
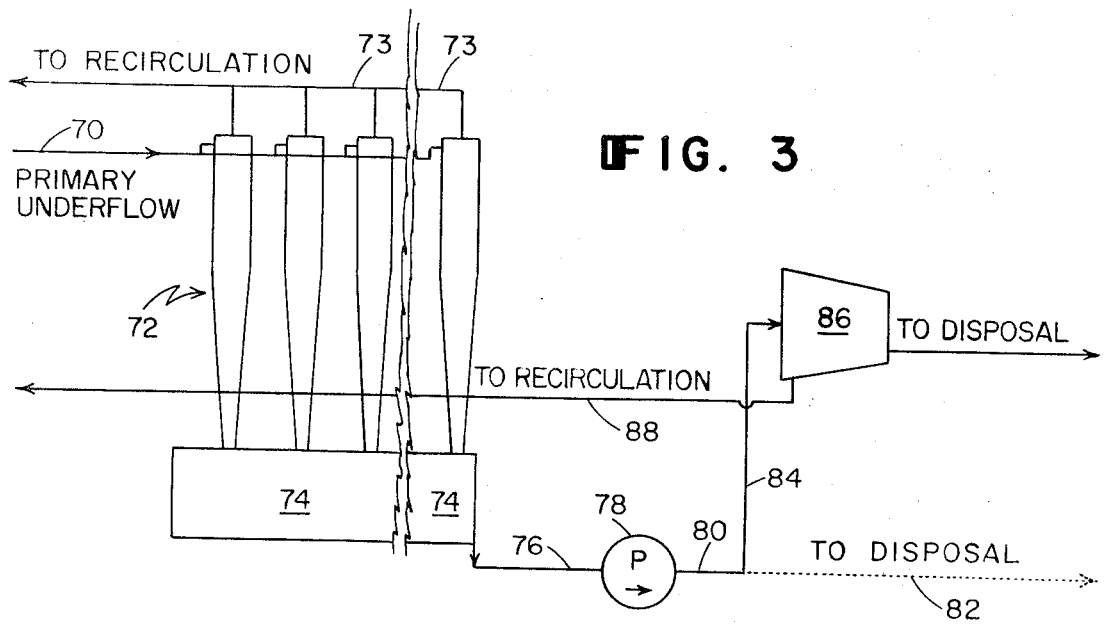
FIG. 3 is a flow sheet showing a secondary stage treatment that may be used with the primary stage of FIG. 1, and also a tertiary stage treatment.

If the hydrocyclone underflow output of pump 38 goes to a secondary separation stage as is preferred, the effluent from that stage may be returned to the recirculation flow by a pipeline indicated by dotted line 50, which discharges into tank 12. If the underflow from the secondary stage treatment goes to a tertiary stage separation treatment as shown in FIG. 3, the overflow from that stage may be returned to the recirculation flow via a pipeline indicated by dotted line 52, discharging into tank 12. Dotted extension 54 of pipeline 32 having valve 56 permits overflow from the hydrocyclones to be diverted for treatment for the recovery of one or more components of the contained ash, which are of sufficient value and are present in sufficient quantity to warrant such treatment. Valve 56 may be adjusted to divert a small fraction of the flow in pipeline 32 to pipeline 54 on a constant basis or valve 56 may be opened and closed intermittently for intermittent diversion of overflow to pipeline 54. A valve 58 in line 32 may be closed so that all hydrocyclone overflow may be intermittently diverted to pipeline 54.

Figure 2:
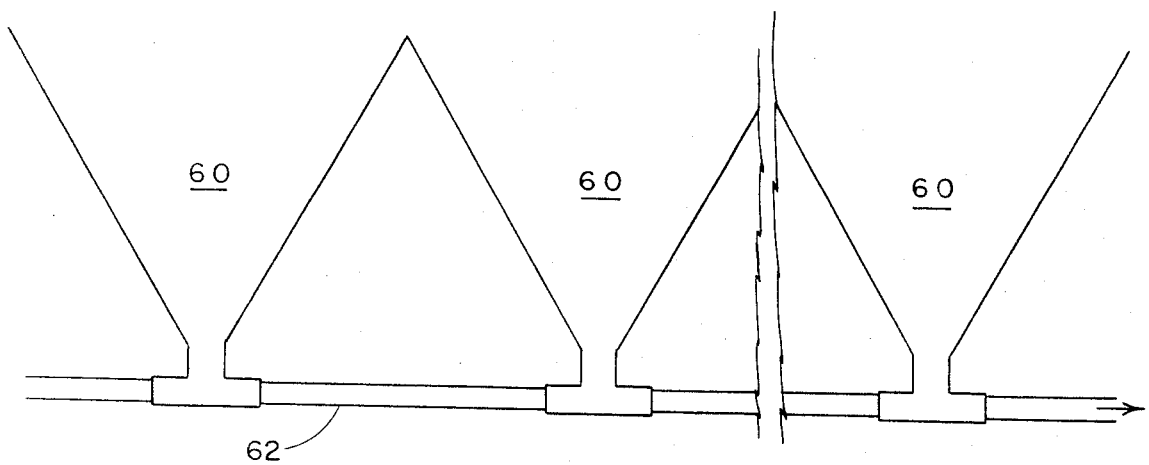
FIG. 2 is a diagrammatic illustration of a system of recirculating water to the precipitator bottoms in the flow sheet of FIG. 1.

FIG. 2 shows an arrangement for recirculating the flow in ash-receiving exposure to the ash precipitated by the precipitators. The precipitator bottoms, partially indicated at 60, which may have the form of inverted truncated hollow pyramids or cones, open directly through the top of a large diameter (e.g., 12 inch), horizontally disposed pipe 62. Pipe 62 is supplied with recirculation flow, shown from left to right as indicated by the arrow, at a rate insufficient to maintain the pipe full, such as a rate sufficient to maintain pipe 62 about half full. The flowing stream in pipe 62 is thus spaced below the open bottom ends of the bottoms 60 and receives the ash as a fall-out from the bottoms. The inclined side walls of the bottoms 60 are preferably shaken or vibrated by external mechanical means (not indicated in the drawing) to insure the sliding of ash deposited thereon into the flowing stream in pipe 62. In the flow sheet of FIG. 1, pipe 62 is supplied by pipeline 18 and discharges to pipeline 10.

In the arrangement of FIG. 2 the ash, received in rapidly moving water flow, has no opportunity to settle, and is kept from settling thereafter by the rapid recirculation flow conditions of the process.

In FIG. 3, the hydrocyclone underflow from the primary stage is supplied by pump 38 of FIG. 1 and its output pipeline to an inlet manifold pipe 70, having branch connections to the inlets of a battery of secondary hydrocyclones indicated generally at 72. Tank 34 in FIG. 1 functions as a surge tank for pump 38 and pipe 70 of FIG. 3 to insure constant regulated feed to the hydrocyclones 72 despite fluctuations in the underflow from the primary stage, or to provide for intermittent operation of hydrocyclones 72 if the underflow from the primary stage is insufficient to feed hydrocyclones 72 constantly at the desired operating rate.

The overflow from hydrocyclones 72 discharges to header pipe 73 which returns the overflow either to the recirculation system of FIG. 1 through connected pipe 50 of FIG. 1, or to tank 34 for recirculation through hydrocyclones 72 by a connection (not shown) from pipe 50 to tank 34. The underflow from hydrocyclones 72 discharges into tank or trough 74 from which drain pipe 76 goes to pump 78 having output pipe 80. In this stage, the hydrocyclone underflow is of such relatively small volume and high concentration of solids (e.g., 10 to 40 percent or higher) that it may be in the desired condition for disposal and, if so, is sent directly thereto (e.g., a truck or barge) from pipe 80 via a connecting pipe indicated by dotted line 82.

However, the secondary stage underflow volume and concentration are also such that it can be dewatered effectively and relatively inexpensively to a substantially dry state, which is frequently desirable. For this purpose, in the flow sheet of FIG. 3, a pipe 84 connects pipe 80 to the feed pipe of a continuous centrifuge 86. The effluent or overflow from this tertiary stage centrifugal separator 86 may be returned to the recirculation system of FIG. 1 via pipeline 88 which is connected to pipe 52 of FIG. 1, or it may be returned to tank 34 or tank 74 by connections (not shown) from pipeline 88. The solids output or underflow from the centrifuge goes to disposal as indicated by the line so marked, for example, by conveyor to a truck or storage bin. Trough 74 can be used as a surge tank if the secondary underflow is insufficient to permit continuous operation of the centrifuge.

Figure 4:
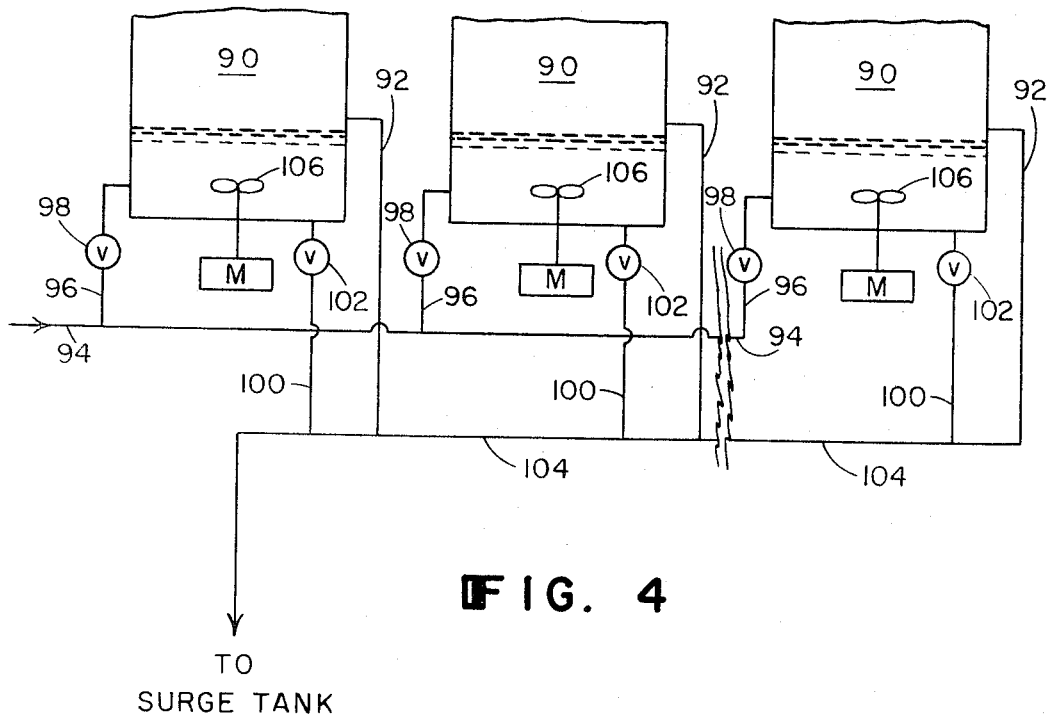
FIG. 4 is a diagrammatic illustration of a modified system for recirculating water to the precipitator bottoms.

FIG. 4 shows another arrangement of precipitator bottoms. In this arrangement, the bottoms are pan-shaped, extend beneath the entire precipitator section, contain water and have no inclined sides as in FIG. 2 to impede the free fall of the precipitated ash into the water.

In FIG. 4, the precipitator bottoms 90 may be filled to a desired level up to overflow pipes 92 via input header pipeline 94 and branch connections 96 with valves 98. The bottoms may be dumped or drained through outlet pipes 100 having valves 102 and connected to header pipeline 104. Overflow pipes 92 are also connected to a header pipeline 104 which goes to a surge tank such as tank 12 of FIG. 1, which has more than sufficient capacity to hold the liquid content of one bottom 90. The bottoms 90 are provided with agitators 106 having external motors indicated by blocks M.

The arrangement of FIG. 4 may be utilized with intermittent fill and drain of each bottom successively. To dump and flush a bottom, its valve 102 is opened so that the contents drain through pipes 100 and 104 to the surge tank. Its valve 98 is then opened, the bottom being allowed to flush so that the water flows out line 100 and through pipeline 104 to the surge tank as fast as it is fed into the bottom via its inlet pipe 96. The rapid flow of water through the bottom flushes out solids that may have settled out thereon during the time between fill and dump, and also receives and carries away the ash falling to the bottom while flushing continues. When flushing is completed the fill cycle is started. To fill a bottom, its valve 102 is closed and its valve 98 is opened until the water level in the bottom reaches a predetermined height below its overflow pipe 92, as may be signaled by a float valve or the like, whereupon valve 98 is closed and remains closed together with valve 102 until the dump and flush cycle is repeated.

The arrangement of FIG. 4 may be utilized in the flow sheet of FIG. 1, in which case pipeline 104 is connected to pipeline 10 of FIG. 1 and pipeline 94 is connected to pipeline 18 of FIG. 1 (or directly to pipeline 46 if the system is designed for circulating all the output of pump 16 through the hydrocyclones on a continuous basis). The operation of the process is the same as shown in the flow sheet of FIG. 1 and also in the flow sheet of FIG. 3 if secondary separation is used, with or without a tertiary stage, except that the system works on the contents of one bottom at a time. Thus, part only of the output of pump 16 may be circulated to hydrocyclones 30, with the remainder recirculated to the bottom being flushed and the hydrocyclone effluent being returned to tank 12. Alternatively, all of the output of pump 16 may go to hydrocyclones 30, with their overflow being recirculated to flush the bottom. The extra capacity of tank 12 allows continuous operation of the system at substantially constant flows.

The precipitator bottoms of FIG. 4 may be filled, dumped and flushed successively on a uniform time basis in which the time between fill and dump of each bottom is sufficiently short so that the accumulation of solids in the water therein does not build up to a concentration such that significant settling out of solids will occur to foul the bottoms or the rest of the system, while the flushing time is sufficient to remove settled solids from the bottoms and to permit the hydrocyclones to reduce the solids percentage to a desired low level.

The motors M of stirrers 106 may be equipped with torsional resistance measuring devices to signal if the solid contents of the water in any bottom is approaching an undesirably high percentage. In the case of such signal, the bottom concerned may be dumped and flushed out of turn if not next in order, with dumping of the next bottom in the time succession delayed for the requisite time, or occurring simultaneously with dumping of the signaling bottom if the capacity of the treating system is adequate to process the contents of two bottoms at the same time. If there is time delay between filling of one bottom and dumping of the next succeeding bottom in the time succession, the remaining contents of tank 12 may be recirculated back to it via pump 16, pipes 18 and 22, valve 24 and pipe 28, or, if these connections are not present, through a by-pass line connecting pipeline 18 or 46 to line 10.

It will be apparent that the recirculation system of FIG. 4 can be operated on a continuous, simultaneous flushing basis for all bottoms, and such is the preferred operation. In such case, the operation would be similar to that of FIG. 2.

Preferred hydrocyclones are of the type used in the paper industry for cleaning paper pulp, such as the hydrocyclones sold by Bird Machine Company, Inc. under the trademark "Cyclean," for example, of 4 inch diameter having a length to diameter ratio in the order of 6:1 to 10:1 and operating at a pressure drop of about 40 p.s.i. This type of hydrocyclone utilizes the high centrifugal force which is generated by the small body diameter. The narrow cone angle characteristic of a pulp hydrocyclone enables the unit to separate and concentrate the low micron sized particles found in fuel ash, and to operate effectively with a low bleed rate of the underflow in the primary stage as is desirable.

Figure 5:
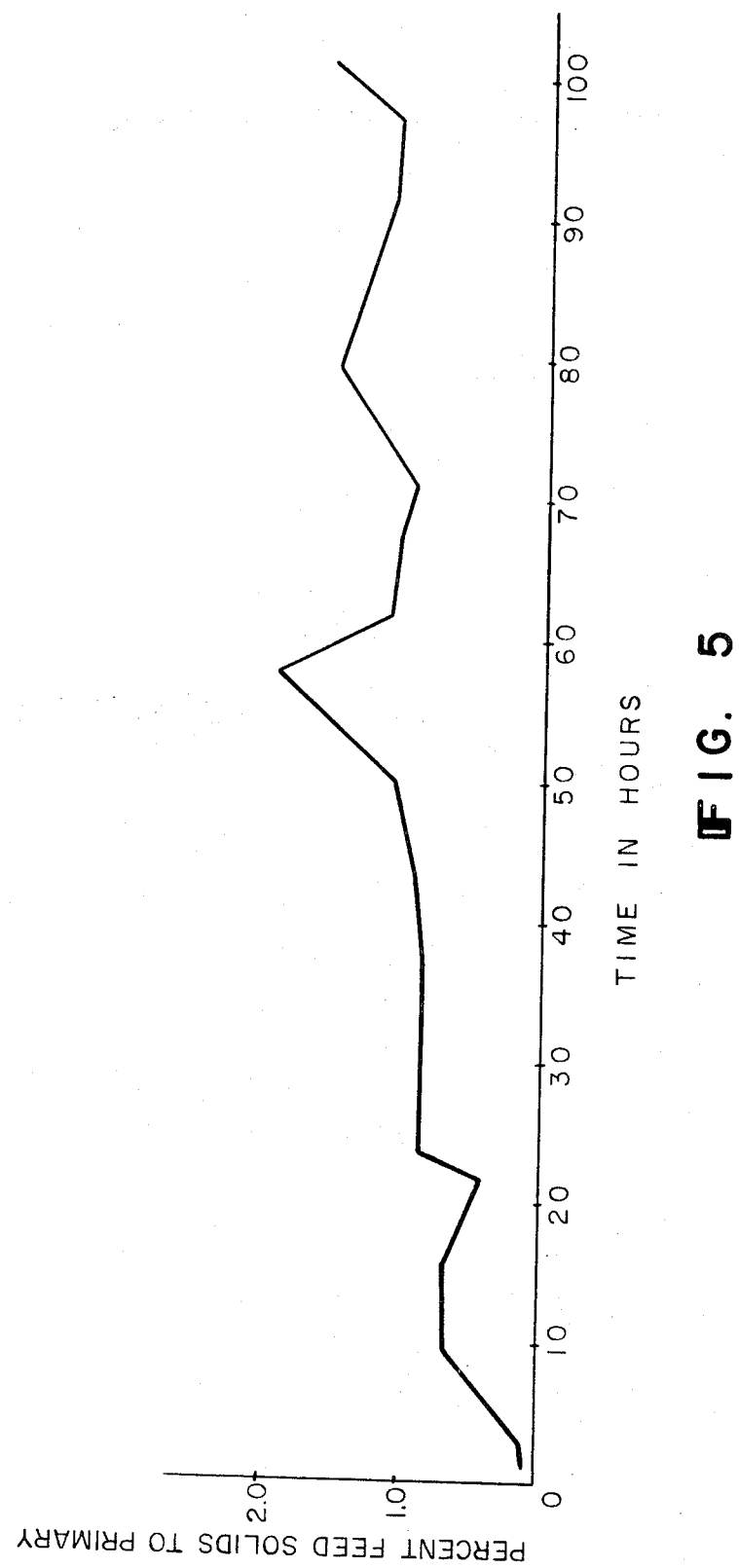
FIG. 5 is a graph showing percent solids in the feed to a primary stage of the process according to FIG. 1 over a 100 hour period of operation from start-up.

FIG. 5 shows percent solids of the primary feed in a pilot operation over a 100 hour period removing oil ash from eight electrostatic precipitator bottoms. The bottoms and water circulation to and from them were like FIG. 2. The primary flow sheet was like FIG. 1. Half of the pump output of 300 g.p.m. from the surge tank was recirculated to the bottoms and back to the surge tank, the other half being fed in parallel to four 4-inch diameter hydrocyclones of the type mentioned above. The underflow from the primary hydrocyclones at 3 g.p.m. was fed to a single secondary hydrocyclone, but since its volume was insufficient for constant feed to the secondary hydrocyclone, it was stored in a tank and fed intermittently to that hydrocyclone, with the overflow being returned to the primary surge tank. The eight precipitator bottoms had an average total ash output of about 2.4 pounds per hour.

The system was started with mixed fresh and salt water. After 1 hour the solids concentration was less than 0.1 percent. By 50 hours it had increased to just over 1 percent. It then increased rapidly to near 2 percent and then fell off, also rapidly, to near 1 percent, leveling off at an average between 1 percent and 1.5 percent. The fluctuations in percent solids were probably due largely to fluctuations in ash output from the precipitator bottoms. The underflow from the secondary hydrocyclone was at a rate of about 2 percent of the feed thereto and had a solids concentration averaging slightly below 10 percent.

When the solids content leveled off, the hydrocyclone system reached a state of equilibrium, namely, that the system rejected per unit of time approximately the same amount of solids that entered the water from the precipitators.

It will be understood that in large installations with many precipitators, such as a 1000 MW or more power plant, several installations according to the flow sheet of FIG. 1 will usually be needed to operate in parallel on different sets or systems of precipitators. Otherwise, the equipment required to handle the flow volume for processing all the ash would be excessively large. In such a power plant currently being converted to the process, separate such installations are being made for processing the ash from the precipitator systems of two oil-fired power units, one a 650 MW unit of which the design rate of the precipitator system is about 93 pounds of ash per hour and the other a 450 MW unit which has a precipitator system design rate of about 80 pounds of ash per hour. The circulating flow to the 650 MW unit precipitator system in an arrangement like FIG. 2 will be about 2,400 gallons per minute or about 144,000 gallons per hour, and such flow to the 450 MW unit precipitator system will be about 2,000 gallons per minute or 120,000 gallons per hour with a total flow for both at 264,000 GPH. It will be noted that the circulation rate for these two precipitator systems is about 1,500 or more gallons per hour per pound of ash from the system, and it is preferred that the circulation rate be at least 1,000 gallons per pound per hour.

On the other hand, the underflow from the primary stage hydrocyclones is so relatively small that it can be processed in one secondary hydrocyclone stage as in FIG. 2, having a single underflow output but parallel return lines to the two primary systems for the overflow in the instance mentioned above. In this system the underflow from the primary units would be about 3,600 GPH, and from the secondary units only about 90 GPH, which represents a flow concentration of about 3,000 to 1.

We claim:

1. A process for removing fuel ash from a precipitator system which comprises the steps of:
    collecting the ash from the precipitator system in water exposed thereto;
    withdrawing ash-containing water from said system and subjecting at least part thereof to centrifugal separation in a hydrocyclone separator stage to provide a major overflow fraction of reduced solids content and a minor underflow fraction of increased solids content;
    recirculating said withdrawn water less said underflow fraction to receive ash from said system; and
    repeating said steps with said recirculated water at a frequency and at such volumetric flow rates as to maintain the solids concentration in the water exposed to said precipitator system below a concentration at which substantial settling-out of suspended solids will occur.

2. A process according to claim 1 wherein said withdrawal and recirculation steps are continuous and at the same volumetric flow rate.

3. A process according to claim 1 wherein said withdrawal and recirculation steps are applied successively and in multiple to different precipitator bottoms of said system.

4. A process according to claim 1 wherein about 30 to 70 percent of said withdrawn ash-containing water is subjected to said centrifugal separation.

5. A process according to claim 2 wherein said ash from said system is collected in a continuously flowing stream of said water exposed thereto.

6. A process according to claim 1 wherein said minor underflow fraction is of the order of 5 percent or less of the feed to said primary hydrocyclone separator stage.

7. A process according to claim 1 which includes the further steps of:
    subjecting said minor underflow fraction to centrifugal separation in a secondary hydrocyclone separator stage to provide a major overflow fraction of reduced solids content and a minor underflow fraction of increased solids content; and
    recirculating said major overflow fraction of said secondary hydrocyclone separator stage.

8. A process according to claim 7 wherein said minor underflow fraction of said secondary hydrocyclone stage is of the order of 2 to 10 percent of the feed to said last named stage.

9. A process according to claim 7 wherein said minor underflow fraction of said secondary hydrocyclone stage is less than about 0.5 percent of said recirculated withdrawn water.

10. A process according to claim 7 which includes the further step of subjecting said minor underflow fraction of said secondary hydrocyclone separation stage to a tertiary stage solids separation treatment to provide a major overflow fraction of reduced solids content and a minor underflow fraction of increased solids content.

11. A process according to claim 10 wherein said major overflow fraction of said tertiary stage treatment is recirculated.

12. A process according to claim 10 wherein said tertiary stage treatment is centrifuging.

13. A process according to claim 10 wherein said tertiary stage treatment is filtering.

14. A process according to claim 1 which includes the further step of segregating a part of said withdrawn recirculated water for treatment for recovery of solids therefrom.

15. A process according to claim 1 which includes the further step of adding chemical to said withdrawn recirculated water.

16. A process according to claim 2 wherein said volumetric flow rate is at least 1,000 gallons per hour per pound of ash discharged from said precipitator system.

* * * * *

UNITED STATES PATENT OFFICE
CERTIFICATE OF CORRECTION

Patent No. 3,788,469   Dated January 29, 1974

Inventor(s) Ernest G. Hirsch et al.

It is certified that error appears in the above-identified patent and that said Letters Patent are hereby corrected as shown below:

Abstract, line 6, change "overflow" to --underflow--.

Col. 3, line 36, change "amptied" to --emptied--.

Signed and sealed this 21st day of May 1974.

(SEAL)
Attest:

EDWARD M. FLETCHER, JR.
Attesting Officer

C. MARSHALL DANN
Commissioner of Patents